United States Patent
Hoogerbrugge et al.

(10) Patent No.: US 10,068,114 B1
(45) Date of Patent: Sep. 4, 2018

(54) SYSTEM AND METHOD FOR IMPLEMENTING A HOST CARD EMULATION (HCE) COMMAND STACK IN A MOBILE PHONE

(71) Applicant: NXP B.V., Eindhoven (NL)

(72) Inventors: Jan Hoogerbrugge, Helmond (NL); Wilhelmus Petrus Adrianus Johannus Michiels, Reusel (NL); Joppe Willem Bos, Wijgmaal (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/701,764

(22) Filed: Sep. 12, 2017

(51) Int. Cl.
*G06K 7/08* (2006.01)
*G06K 7/10* (2006.01)
*G06K 19/07* (2006.01)
*G06N 5/02* (2006.01)
*G06N 99/00* (2010.01)

(52) U.S. Cl.
CPC ..... *G06K 7/10297* (2013.01); *G06K 19/0725* (2013.01); *G06N 5/022* (2013.01); *G06N 99/005* (2013.01)

(58) Field of Classification Search
CPC .............. G06K 7/10297; G06K 19/0725
See application file for complete search history.

(56) References Cited

U.S. PATENT DOCUMENTS

| | | | |
|---|---|---|---|
| 7,162,631 B2 * | 1/2007 | Audebert | G06Q 20/3674 705/67 |
| 8,793,651 B2 * | 7/2014 | Jin Eo | G06F 9/45512 717/115 |
| 9,820,185 B2 * | 11/2017 | Roehrle | H04W 12/06 |
| 2016/0099759 A1 * | 4/2016 | Poon | H04B 5/0056 455/41.1 |
| 2017/0055303 A1 * | 2/2017 | Wang | H04W 8/22 |

OTHER PUBLICATIONS

Barish, G. et al., "Learning Value Predictors for the Speculative Execution of Information Gathering Plans," IJCAI'03 Proceedings of the 18th International Joint Conference on Artificial Intelligence, pp. 3-9, Aug. 9, 2003.

Ploch, M.J., et al, FIDO Alliance, "FIDO 2.0: Client to Authenticator Protocol," https://fidoalliance.org/specs/fido-undefined-v2.0-rd-20161019/fido-inter-device-protocol-v2.0-rd-20161019.html, FIDO Alliance Review Draft Oct. 19, 2016.

Sucipto, K., et al., "Keep Your Nice Friends Close, but Your Rich Friends Closer—Computation Offloading Using NFC," CoRR Journal, arXiv:1612.03000v1 [cs.NI], Dec. 9, 2016.

* cited by examiner

*Primary Examiner* — Seung Lee
(74) *Attorney, Agent, or Firm* — Daniel D. Hill

(57) ABSTRACT

A method for implementing a host card emulation (HCE) service in a remote near field communication (NFC) device is provided. In the method, a first command application protocol data unit (APDU) is received at the remote NFC device from an NFC reader. A first response to the first command APDU is computed. A second command APDU from the NFC reader is predicted that is likely to follow receipt of the first command APDU from the NFC reader. A second response to the predicted second command APDU is computed. A third command APDU is received from the NFC reader. It is determined if the prediction of the second command APDU matches the third command APDU. If the second and third command APDUs match, then the computed second response is send directly to the NFC reader without having to traverse a NFC stack.

21 Claims, 2 Drawing Sheets

SYSTEM AND METHOD FOR IMPLEMENTING A HOST CARD EMULATION (HCE) COMMAND STACK IN A MOBILE PHONE

BACKGROUND

Field

This disclosure relates generally to host card emulation (HCE) and more specifically to a system and method for implementing an HCE command stack in a mobile phone.

Related Art

Contact-less smartcards based on near field communication (NFC) are commonly used for payment, building access, transit applications, and the like. Some Android-based mobile phones and other devices provide an NFC functionality called host card emulation (HCE) that allows the mobile phone to function as a smartcard for various applications. HCE processes commands in an instruction stack. The commands are received by, for example, the mobile phone and processed by a user application on the mobile phone. This is done through a command APDU (Application Protocol Data Unit) that includes application-level packets exchanged between an NFC reader and the HCE service in the mobile phone. The mobile phone receives and executes a command, and then sends a response APDU command back to the reader via the NFC field. A typical command sequence consists of 10-20 commands and responses.

One issue with HCE is that it may take a significant amount of time to receive the command APDU, process the command, and provide a response back to the NFC reader. Each time a command APDU is received, the command APDU moves upward in the stack from an NFC controller to the application. The application computes a response and then the response traverses downward in the stack back to the NFC controller. The time to traverse the HCE software stack in 'upward' (the command) and 'downward' (the response) directions dominates the time that it takes to execute the command. One reason that it takes a long time to traverse the HCE stack is due to context switches that are necessary to provide a secure system.

The longer the execution time of a command, the longer the user is required to hold the mobile phone against the NFC reader to successfully execute the transaction. A long execution time may be inconvenient for the user.

Therefore, a need exists for a method to reduce the execution time for commands and responses to traverse the HCE stack.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
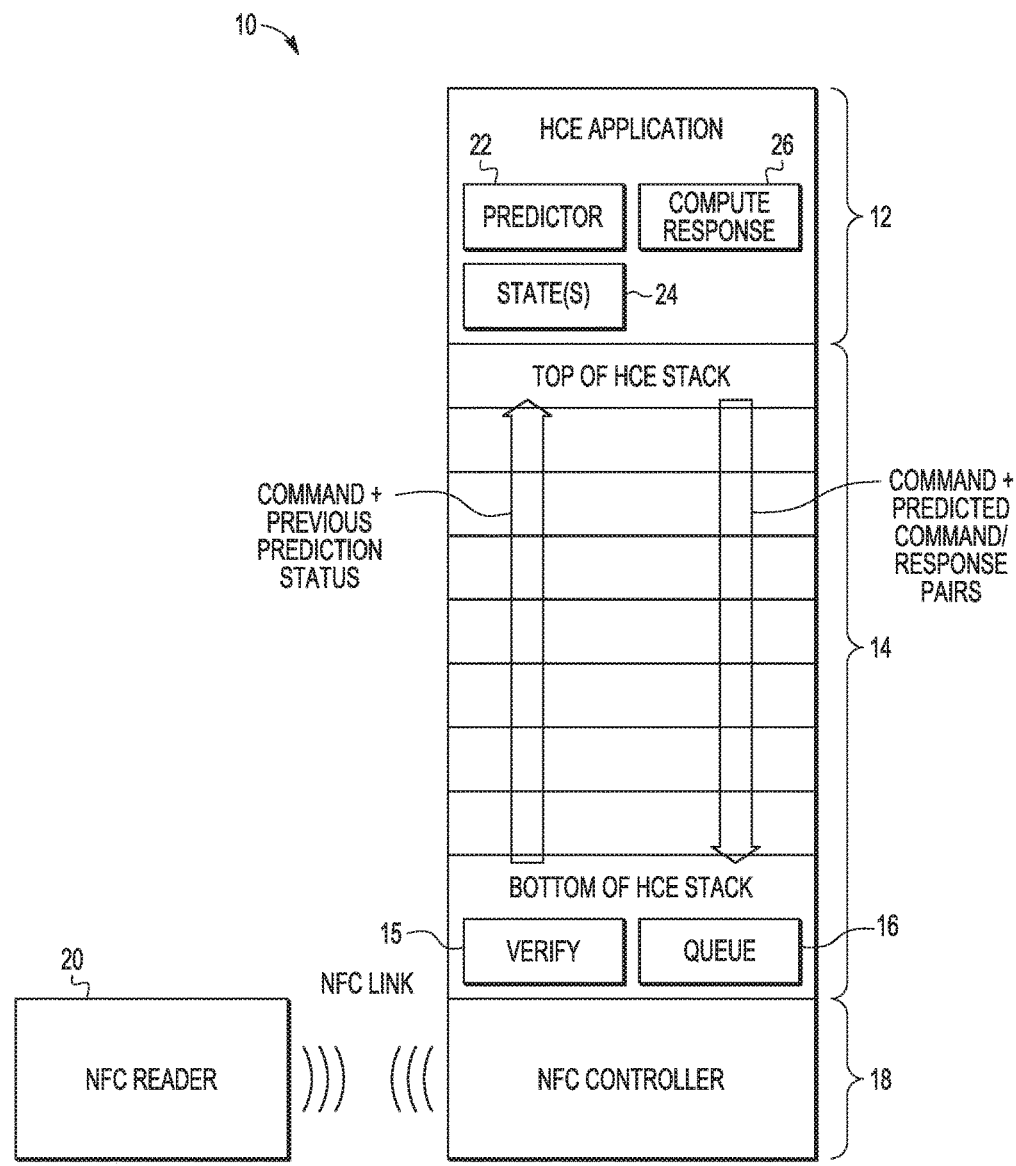
FIG. 1 illustrates a system for implementing a HCE service in a mobile phone in accordance with an embodiment.

Generally, there is provided, a method for reducing the number of traversals in an HCE command stack of a remote NFC device. The method predicts the next command and computes a response to the predicted next command so that the response is ready if the prediction is correct. The predicted next command and the computed response are held in a prediction queue in a lower layer of the HCE command stack so that it is ready to be provided directly to the NFC reader without sending the command upward through the HCE command stack and then the response back down through the stack. A learning algorithm is used to determine the predictions. A number of responses to a predicted sequence of commands can be pre-computed and held ready to be transmitted to the NFC reader.

The disclosed prediction system and method reduces execution time of command sequences in the HCE command stack, thus reducing the time required to process, for example, a payment transaction. This improves the functionality of the remote NFC device, such as for example, a mobile phone.

In accordance with an embodiment, there is provided, a method for implementing a host card emulation (HCE) service in a remote near field communication (NFC) device, the method comprising; receiving a first command application protocol data unit (APDU) at the remote NFC device from an NFC reader; computing a first response to the first command APDU; predicting a second command APDU from the NFC reader that is likely to follow receipt of the first command APDU; computing a second response to the second command APDU; receiving a third command APDU from the NFC reader; and determining if the prediction of the second command APDU matches the third command APDU. Predicting a second command APDU may further comprise predicting a series of command APDUs that are likely to follow the receipt of the first command APDU. Computing a response to the second command APDU may further comprise computing a response to each of the predicted series of command APDUs. The method may further comprise storing the predicted second command APDU and the response to the second command APD in a prediction queue at a bottom of an HCE stack. Determining if the prediction of the second command APDU matches the third command APDU may further comprise determining that the second command APDU does not match the third command APDU and flushing the prediction queue. Determining if the prediction of the second command APDU matches the third command APDU may further comprise determining that the prediction does match, and in response to the match, transmitting the second response to the NFC reader. The method may further comprise determining a processing state of the remote NFC device based on a number of correctly predicted commands. The remote NFC device may be characterized as being a mobile phone. The method may be for implementing an access application, a transit application or a payment application on the remote NFC device. Predicting the second command APDU may further comprise predicting the second command APDU using a learning algorithm, the learning algorithm predicting a next likely command APDU based, at least in part, on a number of times the next likely command APDU has been received by the remote NFC device.

In another embodiment, there is provided, a method for implementing a host card emulation (HCE) service in a remote near field communication (NFC) device, the method comprising: receiving a first command application protocol data unit (APDU) at the remote NFC device from an NFC reader; computing a first response to the first command APDU; predicting a command APDU that is determined to be likely to be a next command received from the NFC reader; computing a response to the predicted command APDU; holding the predicted command APDU and the response to the predicted command APDU in a predicted command/response queue at a lower layer of a HCE stack of the remote NFC device; receiving a second command APDU from the NFC reader; and comparing the predicted command APDU to the second command APDU. Predicting a command APDU may further comprise predicting a series of command APDUs that are likely to follow the receipt of the second command APDU. Computing a response to the predicted command APDU may further comprise computing a response to each of the predicted series of command APDUs. The method may further comprise determining that the predicted command APDU does not match the second command APDU and flushing the predicted command/response queue. The method may further comprise determining that the predicted command APDU matches the second command APDU, and transmitting the computed response to the NFC reader. The method may further comprise determining a processing state of the remote NFC device based on a number of correctly predicted commands. The remote NFC device may be characterized as being a mobile phone. The method may be for implementing an access application, a transit application, or a payment application on the remote NFC device. Predicting the command APDU may further comprise predicting the command APDU using a learning algorithm, the learning algorithm predicting a next likely command APDU based, at least in part, on a number of times the command APDU has been previously received by the remote NFC device. The method may be implemented in an operating system for a mobile phone.

In yet another embodiment, there is provided, a remote near field communication (NFC) system having a host card emulation (HCE) service, the system comprising: a NFC controller for wirelessly communicating with a NFC reader, the NFC controller receiving command application protocol data units (APDUs) and transmitting computed responses to the command APDUs to the NFC reader; and a HCE stack, the received commands from the NFC controller traversing the HCE stack from a bottom of the HCE stack to a top of the HCE stack to be provided to a user application, the user application receiving the command APDUs via the HCE stack, the user application computing the responses to the command APDUs, the responses traversing the HCE stack from the top to the bottom, the user application predicting next commands to be received by the NFC controller and computing responses to the predicted commands, the computed responses being provided directly to the NFC reader without traversing the HCE stack.

FIG. 1 illustrates a system 10 for implementing an HCE service in a mobile phone in accordance with an embodiment. System 10 includes a user application 12, HCE command stack 14, verify block 15, prediction queue 16, and NFC controller 18. User application 12 includes predictor block 22, processing state 24, and response computer 26. System 10 is illustrated in wireless NFC communication with NFC reader 20. Applications, such as application 12, running on a host central processing unit (CPU) are used to provide the required functionality. An application may be called in response to an NFC communication between NFC controller 10 and NFC reader 20. HCE command stack 14 is a software architecture that allows an electronic device having NFC, such as an NFC enabled mobile phone running the Android operation system, to emulate a smart card for use in secure access, payment, or transit applications. The HCE command stack includes a series of instructions that need to be traversed each time a command is received from NFC reader 20. When application 12 is activated, commands from NFC reader 20 traverse HCE stack 14 from bottom to top as illustrated in FIG. 1. Commands are received from NFC reader 20 by NFC controller 18 and traverse HCE stack 14 from the "bottom of HCE stack" to the "top of HCE stack". A response to the command is computed by response computer 26 in application 12. Stack transversal for the response starts at the "top of HCE stack" and proceeds to the "bottom of HCE stack" to NFC controller where the response is transmitted to NFC reader 20.

Figure 2:
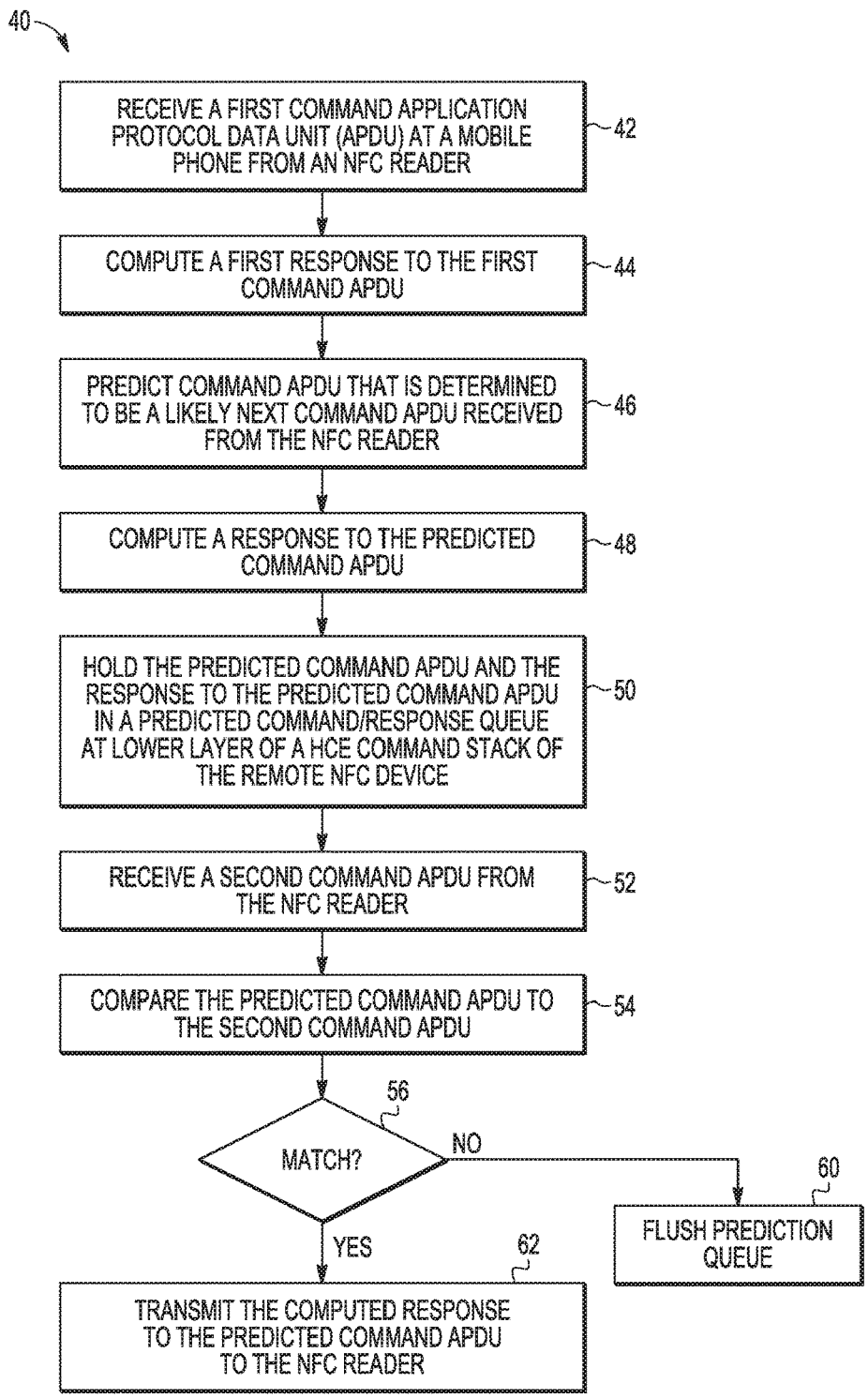
FIG. 2 illustrates a method for implementing a HCE service in a mobile phone in accordance with an embodiment.

It can take a significant amount of time for the commands and responses to the commands to traverse up and down the stack. To reduce the time required for commands and response to traverse the stack, when a command is received by NFC controller 18, in addition to computing a response to the command, predictor 22 of application 12 makes a prediction as to what the next command will be. Then a response to the next command is computed using response computer 26. To predict the next command, a learning algorithm may be used. After executing the current command to produce a response, the next command may be predicted and the response to the predicted command precomputed. The predictions may be repeated to produce a series of command predictions until the learning algorithm can no longer be sure about which command will follow. A process function having the new API (application program interface) for HCE that includes functions for compute and prediction may be:

APDU compute(APDU c)
  {
    //the actual computation . . .
  }
APDUs process(APDU c, int i)
  {
    APDU r, $c_1 \ldots c_n$, $r_1 \ldots r_n$;
    restore_speculative_state(i);
    r=compute(c);
    update_predictor(c);
    $\{c_1 \ldots c_n\}$=predict_next();
    $r_1$=compute($c_1$);
    . . .
    $r_n$ =compute($c_n$);
    return $\{r, c_1 \ldots c_n, r_1 \ldots r_n\}$;
} where c is the command APDU received from NFC reader 20 and r is the response to the received command. Commands $c_1 \ldots c_n$, are predicted command APDUs. Responses $r_1 \ldots r_n$ are computed responses to the predicted commands. Argument i is the number of correctly predicted command APDUs. In system 10, all predicted command APDUs and their computed responses will traverse downward in the stack from the top to the bottom in one step. The predicted command APDUs and corresponding responses will be held in prediction queue 16 in a lower layer at the bottom of stack 14. The response r can then be directly transmitted to NFC reader 20 without having to traverse HCE stack 14. Alternately, the predicted commands and responses may be stored in NFC controller 18 instead of a lower layer in the bottom of HCE stack 14. When the next incoming command APDU from NFC reader 20 matches predicted command $c_1$, then NFC controller 18 or an interrupt handler (not shown) that handles the incoming NFC commands will directly return the corresponding response $r_1$. The prediction saves the time of traversing HCE command stack 14 for this command APDU. Similarly, if the next command APDU from NFC reader 20 is the predicted command $c_2$, then response $r_2$ is returned without traversing the entire stack. This is repeated until all of the command responses are handled or until a command is received that is predicted incorrectly. If a command is predicted incorrectly, then prediction queue 16 is flushed, or emptied, and a new series of predictions begins, The argument i of correctly predicted command APDUs is passed to a process function. Predictor 22 uses argument i to determine which internal state to continue execution of command APDU c. It should use the state of application 12 after executing command APDU $c_i$ in the previous invocation of the process function. It may be expected that with a typical command sequence, between 3 and 8 command APDUs may be correctly predicted after executing a command APDU. This reduces the number of traversals of HCE stack by the same amount, thus having a significant effect on execution time, FIG. 2 illustrates a method 40 for implementing an HCE service in a mobile phone in accordance with an embodiment. Method 40 begins at step 42. At step 42, a first command APDU is received at a mobile phone from an NFC reader. At step 44, a first response to the first command APDU is computed using response computer 26. At step 46, a command APDU is predicted that is likely to be a next command APDU to be received from NFC reader 20. At step 48, a response to the predicted command APDU is computed. At step 50, the predicted command APDU is held in queue 16 in a lower layer at the bottom of HCE stack 14. At step 52, a second command APUD is received from NFC reader 52. At step 54, the predicted command APDU is compared to the second command APDU. At decision step 56, it is determined if the second command matches the predicted command. If NO, the NO path is taken to step 60. At step 60, because the prediction was incorrect, prediction queue 16 is flushed. If at decision step 56 the predicted command and the second command match, then the YES path is taken to step 62. At step 62, the computed response to the correctly predicted command APDU is transmitted to NFC reader 20.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for implementing a host card emulation (HCE) service in a remote near field communication (NFC) device, the method comprising:
   receiving a first command application protocol data unit (APDU) at the remote NFC device from an NFC reader;
   computing a first response to the first command APDU;
   predicting a second command APDU from the NFC reader that is likely to follow receipt of the first command APDU;
   computing a second response to the second command APDU;
   receiving a third command APDU from the NFC reader; and
   determining if the prediction of the second command APDU matches the third command APDU.

2. The method of claim 1, wherein predicting a second command APDU further comprises predicting a series of command APDUs that are likely to follow the receipt of the first command APDU.

3. The method of claim 2, wherein computing a response to the second command APDU further comprises computing a response to each of the predicted series of command APDUs.

4. The method of claim 1, further comprising storing the predicted second command APDU and the response to the second command APD in a prediction queue at a bottom of an HCE stack.

5. The method of claim 1, wherein determining if the prediction of the second command APDU matches the third command APDU further comprises determining that the second command APDU does not match the third command APDU and flushing the prediction queue.

6. The method of claim 1, wherein determining if the prediction of the second command APDU matches the third command APDU further comprises determining that the prediction does match, and in response to the match, transmitting the second response to the NFC reader.

7. The method of claim 1, further comprising determining a processing state of the remote NFC device based on a number of correctly predicted commands.

8. The method of claim 1, wherein the remote NFC device is characterized as being a mobile phone.

9. The method of claim 1, wherein the method is for implementing an access application, a transit application or a payment application on the remote NFC device.

10. The method of claim 1, wherein predicting the second command APDU further comprises predicting the second command APDU using a learning algorithm, the learning algorithm predicting a next likely command APDU based, at least in part, on a number of times the next likely command APDU has been received by the remote NFC device.

11. A method for implementing a host card emulation (HCE) service in a remote near field communication (NFC) device, the method comprising:
   receiving a first command application protocol data unit (APDU) at he remote NFC device from an NFC reader;
   computing a first response to the first command APDU;
   predicting a command APDU that is determined to be likely to be a next command received from the NFC reader;
   computing a response to the predicted command APDU;
   holding the predicted command APDU and the response to the predicted command APDU in a predicted command/response queue at a lower layer of a HCE stack of the remote NFC device;
   receiving a second command APDU from the NFC reader; and
   comparing the predicted command APDU to the second command APDU.

12. The method of claim 11, wherein predicting a command APDU further comprises predicting a series of command APDUs that are likely to follow the receipt of the second command APDU.

13. The method of claim 12, wherein computing a response to the predicted command APDU further comprises computing a response to each of the predicted series of command APDUs.

14. The method of claim 11, further comprising determining that the predicted command APDU does not match the second command APDU and flushing the predicted command/response queue.

15. The method of claim 11, further comprising determining that the predicted command APDU matches the second command APDU, and transmitting the computed response to the NFC reader.

16. The method of claim 11, further comprising determining a processing state of the remote NFC device based on a number of correctly predicted commands.

17. The method of claim 11, wherein the remote NFC device is characterized as being a mobile phone.

18. The method of claim 11, wherein the method is for implementing an access application, a transit application, or a payment application on the remote NFC device.

19. The method of claim 11, wherein predicting the command APDU further comprises predicting the command APDU using a learning algorithm, the learning algorithm predicting a next likely command APDU based, at least in part, on a number of times the command APDU has been previously received by the remote NFC device.

20. The method of claim 11, wherein the method is implemented in an operating system for a mobile phone.

21. A remote near field communication (NFC) system having a host card emulation (HCE) service, the system comprising:
   a NFC controller for wirelessly communicating with a NFC reader, the NFC controller receiving command application protocol data units (APDUs) and transmitting computed responses to the command APDUs to the NFC reader; and
   a HCE stack, the received commands from the NFC controller traversing the HCE stack from a bottom of the HCE stack to a top of the HCE stack to be provided to a user application,
   the user application receiving the command APDUs via the HCE stack, the user application computing the responses to the command APDUs, the responses traversing the HCE stack from the top to the bottom, the user application predicting next commands to be received by the NFC controller and computing responses to the predicted commands, the computed responses being provided directly to the NFC reader without traversing the HCE stack.

* * * * *